United States Patent [19]
Hinrichs

[11] 3,933,958
[45] *Jan. 20, 1976

[54] METHOD OF MAKING TUBULAR PLASTIC FILM

[75] Inventor: Donald R. Hinrichs, Waynesboro, Va.

[73] Assignee: Reynolds Metals Company, Richmond, Va.

[*] Notice: The portion of the term of this patent subsequent to Oct. 30, 1990, has been disclaimed.

[22] Filed: July 12, 1973

[21] Appl. No.: 378,531

Related U.S. Application Data

[62] Division of Ser. No. 126,831, March 22, 1971, Pat. No. 3,752,635.

[52] U.S. Cl. .................... 264/40; 264/95; 264/209; 264/210 R; 264/237; 264/290 R
[51] Int. Cl.² .................... B29D 23/04; B29F 3/08
[58] Field of Search ... 264/95, 89, 237, 209, 210 R, 264/290; 425/66, 72, 326 R, 378, 380

[56] References Cited
UNITED STATES PATENTS

| | | | |
|---|---|---|---|
| 2,937,402 | 5/1960 | Pierce | 425/206 |
| 3,266,092 | 8/1966 | Corbett | 264/209 |
| 3,321,805 | 5/1967 | Given | 425/380 |
| 3,385,917 | 5/1968 | Breukink et al. | 264/348 |
| 3,475,789 | 11/1969 | Stroup et al. | 425/109 |
| 3,577,488 | 5/1971 | Bigland | 264/95 |
| 3,769,379 | 10/1973 | Hinrichs | 264/210 R |

Primary Examiner—Jeffrey R. Thurlow
Attorney, Agent, or Firm—Glenn, Palmer, Lyne & Gibbs

[57] ABSTRACT

Plastic film is made using a heat transfer liquid circulated through the film extrusion die to control (by either heating or cooling, as required) the temperature of the plastic melt flowing through such die. A plastic bubble emerging at the outlet of the die is inflated and ventilated by continuously circulated gas which is controlled in temperature as it enters and leaves the bubble so that it does not adversely affect the temperature of the melt in the die.

7 Claims, 9 Drawing Figures

FIG-7 ing patent application Ser. No. 126,831, filed Mar. 22, 1971, now U.S. Pat. No. 3,752,635.

METHOD OF MAKING TUBULAR PLASTIC FILM

This application is a divisional of applicant's copending patent application Ser. No. 126,831, filed Mar. 22, 1971, now U.S. Pat. No. 3,752,635.

BACKGROUND OF THE INVENTION

Plastic film has long been made by inflating a tubular section being extruded from an annular orifice in a die to define a tubular film bubble and then collapsing the tube between a pair of cooperating rollers to define a double thickness film which is rolled on a take-up roll. Control of the temperature of a plastic melt flowing through an extrusion die has been a problem. Degradation of the melt within the die or build-up of solidified melt along the inner lip of the die outlet can have adverse effects on film quality and shorten the operating cycle of the die before the die must be shut down for recleaning of the die passages. Temperature control is important for achieving uniform gauge across the width of the film strip after slitting of the extruded tube. Any lack of uniform gauge is magnified when the film is subsequently stretched, as it frequently is for purposes of making oriented heat-shrinkable film.

SUMMARY

This invention provides an improved apparatus and method for extruding plastic film in a more economical manner, due to longer operating cycles between shutdowns, and with improved uniformity of gauge transversely of the direction of extrusion. This apparatus and method employs a temperature and flow controlled heat transfer liquid which is circulated through the extrusion die to control (by either heating or cooling, as required) the temperature of the plastic melt flowing through the die. Air or other gas used to inflate and ventilate the plastic bubble emerging from the die outlet is also controlled in temperature when it passes through the die so as to not adversely affect the temperature of the melt in the die.

Other details, uses, and advantages of this invention will become apparent as the following description of the embodiment thereof presented in the accompanying drawings proceeds.

BRIEF DESCRIPTION OF THE DRAWINGS

The accompanying drawings show a present preferred embodiment of this invention, in which.

DESCRIPTION OF ILLUSTRATED EMBODIMENT

Figure 1:
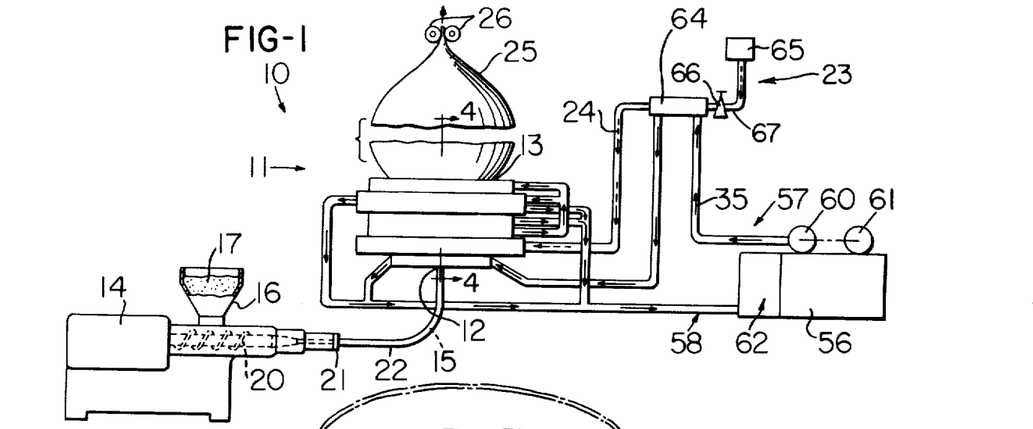
FIG. 1 is a schematic side elevation, partly sectioned and partly broken away, of a film extrusion die and associated temperature control apparatus, including the emerging tubular film bubble and pinch rolls.

The apparatus shown in FIG. 1 of the drawings is designated generally by the reference numeral 10 and is adapted for extruding polyvinyl chloride, nylon, or other polymeric or like plastic material to produce a thin plastic film.

The apparatus 10 comprises an extrusion die 11 having an inlet 12 and an annular outlet 13 and an extruder 14 supplies a hot plastic melt 15 under pressure to the inlet 12. A supply bin 16 feeds the extruder 14 with a suitable plastic material 17 in flowable particulate form; and, the extruder 14 has heating means for melting the plastic material 17 and a helical screw 20 for forcing the molten material or melt 15 through an outlet 21 and through a supply conduit 22 to the die inlet 12. The plastic melt 15 is supplied to the inlet 12 at a controlled and substantially constant temperature suitable for the physical and chemical properties of the plastic material 17.

The apparatus 10 has means indicated generally at 23 for supplying air or other suitable gas (designated by dotted arrows 24) through the die 11 to inflate a tube produced by extrusion of the plastic melt 15 through the annular die outlet 13, and such tube is pinched by rollers 26 to trap a moving film bubble 25 between the die outlet and the rollers. The double thickness of film passing from the rollers 26 may be wound on a supply roll or further processed in any suitable manner known in the art. The tube is split and the film is stretched to increase its area and then chilled to retain it in stretched condition. It is then a condition for subsequent heat shrinking for packaging purposes.

Figure 3:
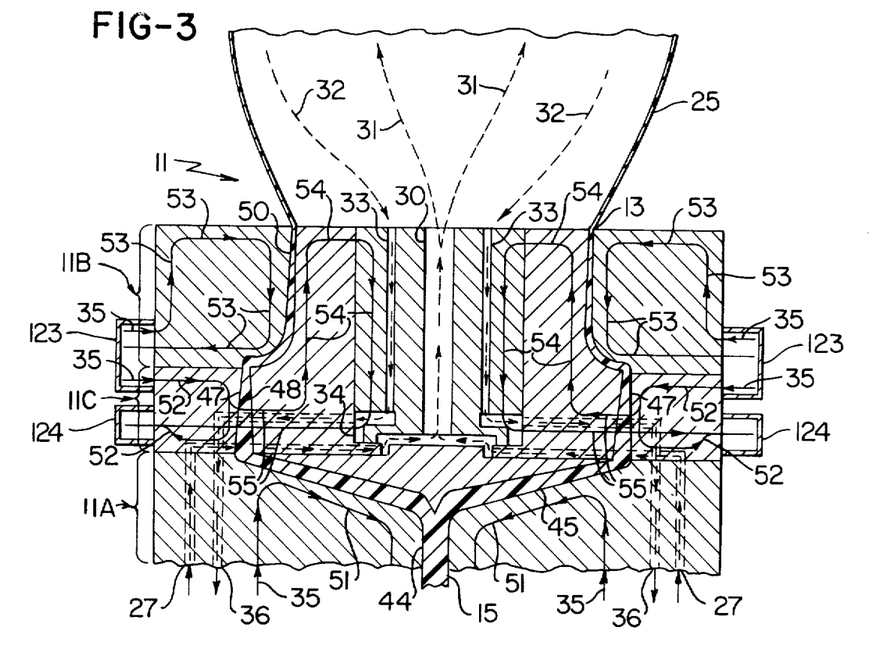
FIG. 3 is a schematic and partially broken away fragmentary cross-section view taken on the axis of the film extrusion die shown in FIG. 1.

The air 24 is suitably supplied to the die 11 and is conveyed axially therethrough using circumferentially spaced passages 27, see FIG. 3. The air is then conveyed by radially inwardly directed passages to a central cylindrical passage 30 which extends substantially axially through the upper end portion of the die 11 into the film bubble 25. The air 24 is supplied at a controlled temperature and pressure to cause expansion of the film bubble 25 in a precisely controlled manner.

The air 24 flows into the center of bubble 25 through passage 30 and initially flows upwardly into such bubble as indicated by the arrows 31. It then flows downwardly along the sides of the bubble (as indicated by the arrows 32) into a plurality of passages 33 through the die which extend in spaced parallel relation to each other and are arranged concentrically around the central passage 30. The passages 33 communicate with an annular chamber 34 and one or more passages 36 are provided in die 11 in flow communication with chamber 34 for conveying the air in such chamber out of the die.

Volatile substances from the plastic melt pass into the air in the bubble, and tend to build up in concentration as more film passes around the bubble. Moreover, cold air is blown (by conventional means, not shown) against the outside of the emerging extruded film to chill and solidify it. These effects can lead to condensation of the volatile substances and consequent damage to the film upon being contacted by the condensate. Continuous withdrawal of air in the bubble 25 prevents such build up of concentration of volatiles and, thus, protects the film from the damaging effects of excessive concentration of volatiles.

The apparatus and method of this invention uses a heat transfer fluid in the form of a liquid designated by solid arrows 35. The liquid 35 provides efficient temperature control of the melt 15 in the die by either heating or cooling the melt, as required in different parts of the die. In addition, the liquid 35 is also used (as will be described subsequently), to control the temperature of the air 24 entering and leaving the bubble 25 to further assure precise control of the temperature and, hence, even flow of the melt through the die 11. The liquid 35 is supplied to the die from a manifold 123 which encircles the die.

While the liquid 35 might for heating purposes be replaced by fluids in other phases, such as gases or gaseous vapors (e.g., steam), a liquid is far superior because it can function efficiently both for heating and cooling, which is part of the intended operation of the apparatus and method of the invention. Steam and like vapors may be suitable for heating but are unsuitable for cooling in dies of the kind in question. Gases like air are inefficient for both heating and cooling in dies of the kind in question, because of poor heat absorption and heat transfer capacity.

During operation of the apparatus 10, the melt 15 enters inlet 12 and travels vertically upwardly through a cylindrical passage 44 in a lower portion 11A of die 11. The melt 15 flares outwardly from the top of passage 44 into an annular conically extending passage 45 in the die lower portion 11A. The die 11 has a stranding chamber 46 in flow communication with the peripheral edge of the passage 45; and a plurality of spaced parallel channels 47 extend through a central portion 11C of die 11 and at their lower ends communicate with the peripheral edge of the stranding chamber 46 and convey the melt therefrom in a plurality of separated plastic strands 48 through the central die portion 11C. The strands 48 are recombined in a combining chamber 49 in the upper portion 11B of the die where the upper ends of channels 47 communicate with chamber 49. The chamber 49 communicates with the lower end of an annular cylindrical passage 50 through the upper die portion 11B. The upper end of passage 50 terminates in the annular die outlet orifice 13.

Die 11 has integral heat transfer means comprising a plurality of cooperating passages in the die body. The lower portion 11A of the die 11 has passages 51 to provide circulation of liquid 35 closely adjacent the melt passing into and through conical passage 45. A plurality of interconnected passages 52 provide flow of liquid 35 through parts of the central die portion 11C and circumferentially around portion 11C where it extends around the outside of the strand channels 47. Other interconnected passages 53 provide circulation of liquid 35 through the upper die portion 11B where it extends around the outside of the annular passage 50. In addition, interconnected passages 54 provide flow of liquid 35 through the central and upper die portions 11C and 11B and have portions which pass closely adjacent to the strand channels 47 and annular passage 50. The passages 54 also extend closely adjacent to return air-conveying passages 33. The interconnected passages 54 of this example are placed in flow communication with the passages 52 through the use of radial passages 55. The passages 55 extend radially through the central die portion 11C and provide flow of liquid 35 between pairs of strand channels 47 and both to and from passages 54. The liquid 35 is collected from the die in manifold 124 which encircles the die.

Figure 2:
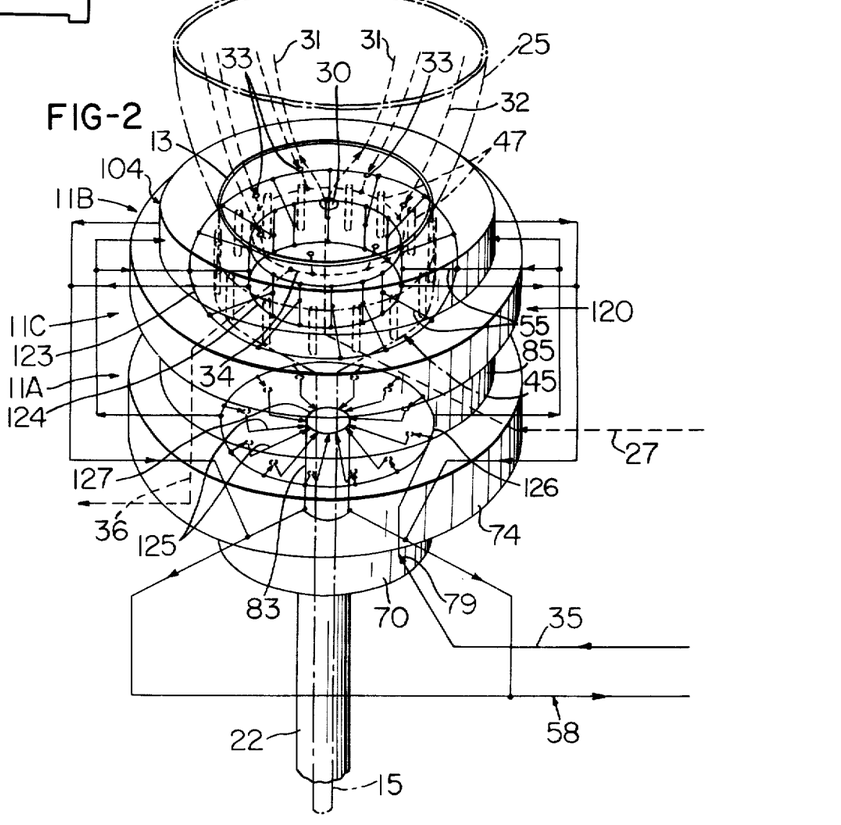
FIG. 2 is a perspective view schematically illustrating the overall flow of fluids through the extrusion die of FIG. 1.

The liquid-conveying passages 51–55 have been shown schematically in FIG. 2; and, it will be appreciated that this has been done for simplicity of presentation. Further, in some applications it may be desired to provide liquid to the passages 54 independently of the passages 52.

Figures 5, 8, 9:
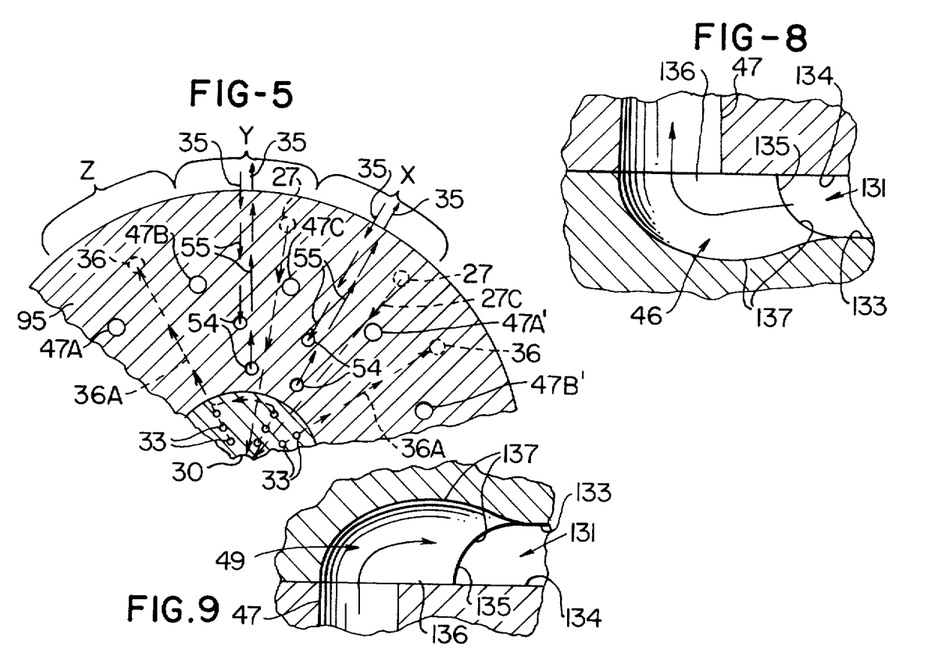
FIG. 5 is a schematic and partially broken away fragmentary cross-section view taken approximately on the line 5—5 of FIG. 4 to show the flow passages of the liquid and gas between the channels carrying the plastic melt.
FIG. 8 is a greatly enlarged fragmentary view particularly illustrating the cross-sectional configuration of a part of the stranding chamber.
FIG. 9 is a view similar to FIG. 8 of the combining chamber.
Figures 6, 7:
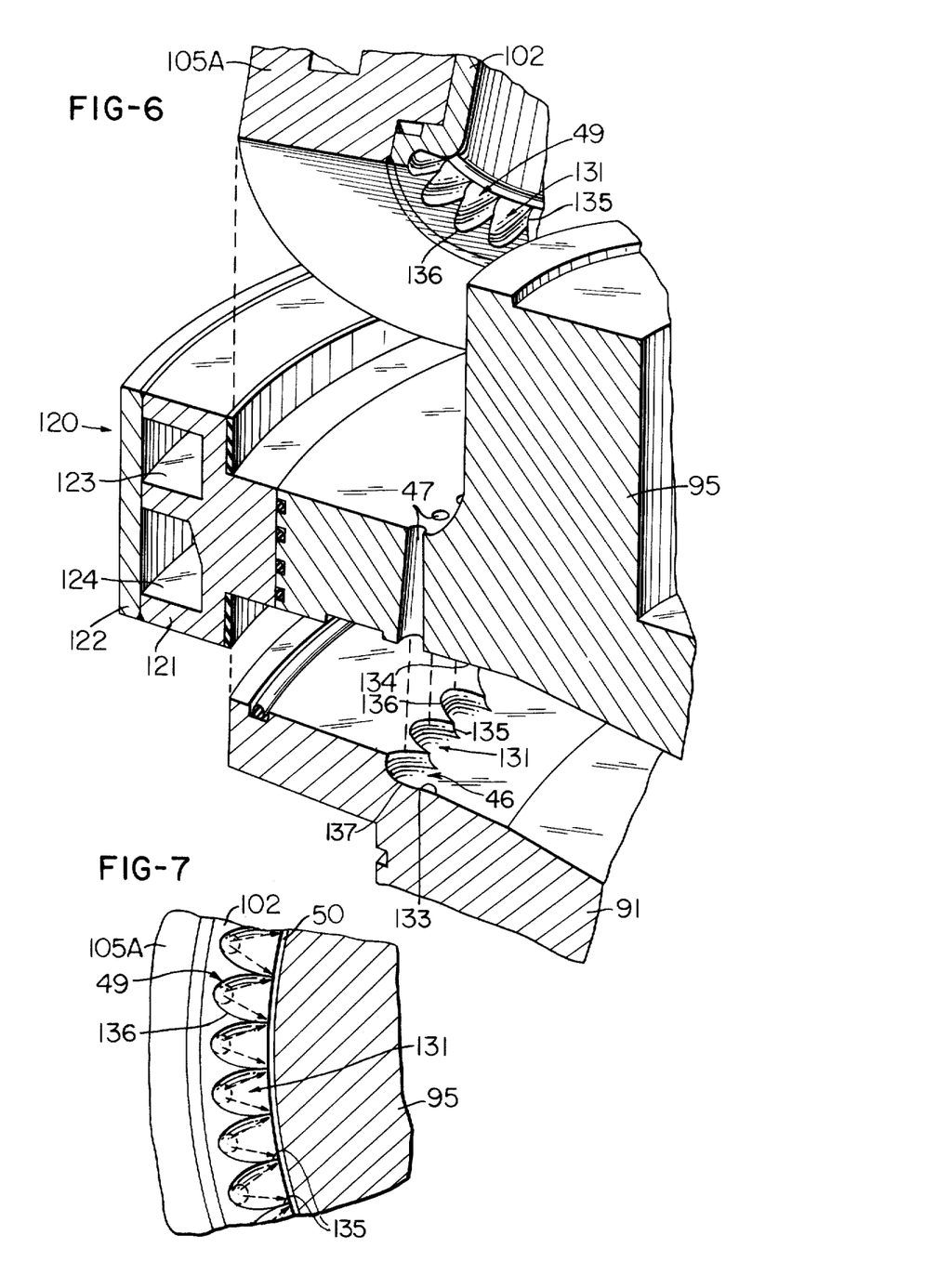
FIG. 6 is an enlarged fragmentary perspective view particularly illustrating the detailed construction of a stranding chamber and a combining chamber comprising the exemplary extrusion die of this invention.
FIG. 7 is a fragmentary cross-sectional view taken essentially on the line 7—7 of FIG. 4.

FIG. 5 shows a schematic arrangement of air and liquid passages in the die as air and liquid pass continuously between the strand channels 47. In the present preferred embodiment of the invention, a series of strand channels designated 47A, 47B, 47C and 47A' have different flow passages for air and liquid between them, and the flow passage pattern is repeated for each succeeding set of four channels (channel 47A' being the first channel of the next series of four) and so on around the die. Between channels 47A and 47B there is a radially extending air outflow passage (indicated by flow arrows designated 36A) connecting passages 33 and 36. About midway between channels 47B and 47C there are radially extending liquid outflow and inflow passages (indicated by flow arrows 55). The liquid outflow and inflow passages are displaced vertically to avoid interference with each other. Incoming preheated air 27A is fed between channels 47B and 47C (shown close to channel 47C for convenience in the figure, but actually midway between channels 47B and 47C and displaced vertically to avoid interference with the liquid passages 55). The arrangement of air and liquid passages between channels 47B and 47C is repeated between channels 47C and 47A'. The pattern is repeated for the next series of four channels as explained above, wherein 47A' is the first channel of the next series.

The liquid 35 thus passing back and forth between strand channels 47 controls the temperature of the metal between strand channels 47 to thereby control the temperature and flow of the melt 15. The liquid 35 also flowing through those portions of passages 54 arranged adjacent air passages 33 supplements the reheating of cooled returning bubble air in passages 33 for purposes of suppressing undue local cooling effect on the melt of the returning air as it passes between strand channels 47.

The incoming air 24 provided to the die 11 is preheated to a temperature close to the temperature of the melt and the liquid 35 flowing through the various interconnected liquid-conveying passages 51–55 assures that the preheated air temperature is equalized with that of the melt as they both flow through die 11. In addition, these liquid-conveying passages are supplied with liquid 35 at the same predetermined temperature, preferably by being connected to a common preheated reservoir and this tends to equalize temperatures throughout the die.

In extruding melt through an associated die the temperature of the melt adjacent the die outlet is greater than the temperature of such melt at the die inlet. To prevent the melt outlet temperature from becoming excessive, which would cause rapid degradation and possible charring of the melt resulting in blockage of the melt passages, the temperature of the liquid 35 flowing through passages 53 and 54 in the upper die portion 11B, for example, is relatively cooler than the temperature of the melt as it flows through die portion 11B whereby such liquid serves to locally cool the melt.

The exemplary apparatus 10 has its supply of heat transfer liquid 35 contained in a reservoir 56, see FIG. 1, and a system is provided for supplying the liquid 35 to the die 11 and returning such liquid to the reservoir 56 and such system comprises a supply conduit system 57, a return conduit system 58, and suitable pressure means in the form of a pump 60 driven by a motor 61 for flowing or circulating the liquid 35 through the conduit systems 57 and 58 and, hence, die 11. The apparatus 10 also has a heat transfer assembly 62 which is provided with heat exchangers and suitable controls for controlling the temperature and flow of liquid 35.

The air 24 supplied to the die 11 for inflating the bubble 25 is preheated in a heat exchanger 64 which is supplied with liquid 35 at a controlled temperature from the assembly 62. The heat exchanger 64 is in the form of an oil-to-air heat exchanger and is supplied with air from a compressor 65. However, the air 24 may be preheated using any suitable technique or may be partially heated prior to being introduced into the heat exchanger 64. An adjustable air pressure regulator 66 is also provided in a supply conduit 67 which provides the air 24 to the inlet passages 27 of the die and the regulator 66 may be adjusted to assure proper inflation of the bubble 25.

In this example, liquid 35 at a predetermined temperature and from reservoir 56 is supplied to all parts of the die 11. The die 11 may be supplied with suitable external conduits so that the flow of liquid through its portions 11A, 11B, and 11C may be in series, parallel, or in series through certain die portions and in parallel through the other portion and vice versa. In addition, the use of parallel flow paths through the die makes it possible to supply liquid at different temperatures and, if desired, from separate reservoirs through each flow path whereby in one portion of the die the liquid 35 provides heating while in another portion of the die such liquid provides cooling. However, regardless of whether a liquid 35 is supplied to each die portion from a single reservoir or a plurality of reservoirs, by having parallel flow paths through the die the rate of liquid flow through each parallel path may be controlled by the configurations and sizes of the flow passages and the use of suitable valves and restrictors whereby the desired amount of heating or cooling provided by the liquid 35 in the associated die portion may be precisely controlled.

To enable easy comprehension of the overall operations of the die 11 the above description has been made referring to only FIGS. 1 and 3 of the drawings. The presentation will now proceed with a more detailed description of the construction and operation of the component parts comprising the exemplary die 11.

Figure 4:
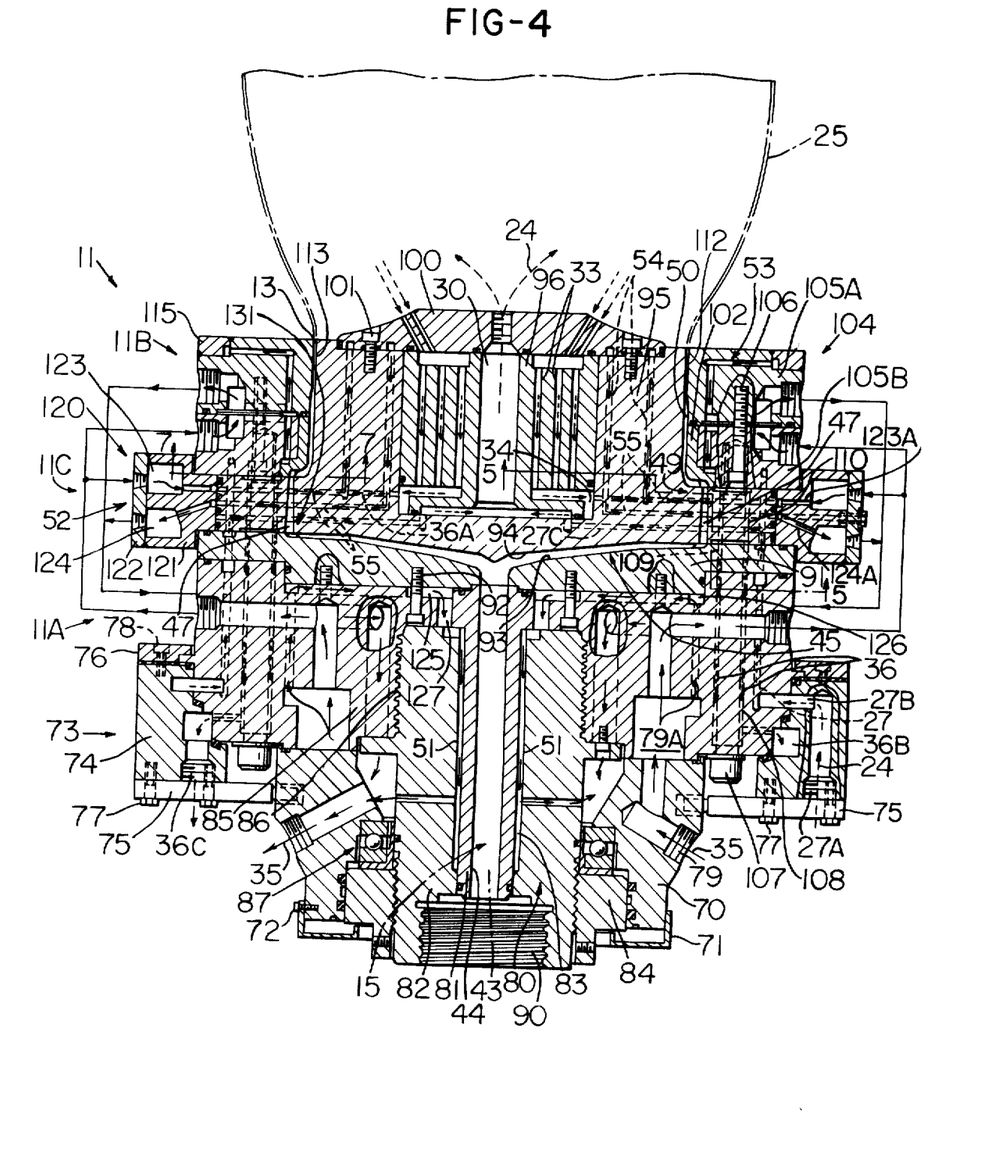
FIG. 4 is a cross-sectional view taken essentially on the line 4—4 of FIG. 1.

As best seen in FIG. 4, the die 11 has a fixed lower or bottom portion comprised of a die stator 70 and a slip ring assembly 73, to be subsequently described in more detail, which allow rotation of the entire remaining upper portion of die 11 relative to the nonrotating film bubble 25 and this compensates for any irregularities or defects which might be present in the annular orifice 13, for example, thereby assuring that rolls wound from the film will have uniform thickness throughout. Uneven flow of the plastic melt through the die 11 is substantially eliminated due to the unique design of its melt flow passages and the precise control of the temperature of the flowing melt.

The die stator 70 has a catch basin 71 suitably fixed thereto by bolts 72. The slip ring assembly 73 is comprised of a central slip ring 74, drive bars 75, and an upper segmented ring 76, with the members 75 and 76 being fixed to the central ring 74 by bolts 77 and 78 respectively.

The stator 70 and assembly 73 are restrained from rotating by a suitable frame or supporting structure and the heat transfer liquid 35 for the die 11 is provided through an inlet 79 in the stator 70 which communicates with an annular chamber 79A. The air 24 used to expand the bubble 25 is provided to the die 11 through an inlet connection 27A in the assembly 73 which supplies air to an annular chamber 27B and the previously described passages 27 are in flow communication with chamber 27B. With this arrangement it is possible to provide continuous rotation of the upper part of the die 11 without concern for the air and heat transfer liquid connections.

The die 11 has an insert and hub portion designated generally by the reference numeral 80 which is comprised of a central member 81 which has passage 44 extending axially therethrough in the form of a right circular cylindrical opening. A member 82 is fastened concentrically around member 81 to define an annular cylindrical passage 83 used to convey liquid 35 closely adjacent the column of melt 15 in passage 44. The lower portion of the member 82 is suitably threadedly fastened to a ring 84.

A die rotor 85 is threadedly fastened to the member 82 as indicated at 86 and the die rotor 85 with the insert and hub assembly 80 fixed thereto is provided with rotary bearing assembly 87. The upper part of die 11 may be easily rotated (while keeping the die stator 70, catch basin 71, and assembly 73 stationary, as previously mentioned) merely by rotating member 82 through a threaded connection 90 provided in the lower portion of the die 11. Although means have not been shown for rotating the upper portion of the die 11, it will be appreciated that any suitable means known in the art may be used for this purpose.

Suitable fluid seals are also provided, as shown in FIG. 4, to assure that neither air 24 nor heat transfer liquid 35 leaks out of the die 11 between the die stator 70, assembly 73, and adjacent rotating components.

The die 11 has what will be referred to as a die base 91 suitably fixed to the die rotor 85 and, hence, assembly 80 by a plurality of bolts 92 and a roughly frustoconical female surface 93 defines the top surface of the die base 91. The surface 93 cooperates with a substantially frustoconical male surface 94 comprising a member which will be referred to as a mandrel shell 95 to define the previously mentioned passage 45. The mandrel shell 95 comprises a part of both the upper die portion 11B and the central die portion 11C.

The die 11 has a member 96 supported in the central portion of the mandrel shell 95 and member 96 comprising the upper portion 11B of such die and has the passages or bores 33 defined therein. The member 96 also has the right circular cylindrical air passage 30 defined substantially centrally therethrough and the passages 33 are arranged in spaced relation concentrically around the central passage 30, see FIGS. 3–5. The member 96 is held in position by a mandrel cap 100 which is attached to the mandrel shell 95 by a plurality of threaded bolts 101. Suitable fluid sealing rings are provided between the members 95, 96 and 100 to assure that the heat transfer liquid 35 and air 24 do not leak into each other's passages.

The die 11 has a pad ring 102 supported concentrically around the lower portion of the mandrel shell 95 so as to define the annular cylindrical volume or passage 50 therebetween; and, the die 11 also has a cup ring assembly 104 comprised of a top cup ring 105A and a bottom cup ring 105B fixed together by a plurality of bolts 106. The assembly 104 is fixed to the die rotor 85 by a plurality of bolts 107 which have plain central portions of extended lengths and threaded end portions. Each central portion of each bolt extends through aligned bores 108, 109, and 110 in the die rotor 85, die base 91, and mandrel shell 95 respectively which have larger diameters than the outside diameter of an associated bolt 107 whereby an annular air discharge passage 36 of extended length is defined between each bolt 107 and its associated aligned bores.

The die 11 had radially extending air discharge passages 36A in member 95, which are shown by dotted lines in FIG. 4 and schematically in FIG. 5, and such passages communicate chamber 34 and the upper ends of passages 36. The lower ends of air passages 36 communicate with an annular chamber 36B through radially extending passages and an outlet connection 36C is provided for discharging the air 24 out of the die.

The threaded end portions of bolts 107 are threadedly fastened in the bottom cup ring 105B. Thus, it is seen that the top outer portion 11B of the die is held to the die rotor 85 by bolts 107 and unique air discharge passages 36 are provided around the outside surfaces of such bolts.

The top cup ring 105A has an inside cylindrical surface 112 which cooperates with an outside cylindrical surface 113 of the mandrel shell 95 to define the upper portion of annular passage 50 and such upper portion terminates in the annular die orifice 13.

A header ring 115 is provided at the top of the die 11 and is fixed in position at the top of and concentrically around the shell 95 by welding. The previously mentioned interconnected passages 53 are provided in the assembly 104 comprising the upper die portion 11B and circulate heat transfer liquid 35 adjacent the outside surface of the melt 15 as it is extruded in tubular form through the passage 50.

The die 11 has a manifold assembly or manifold 120 comprised of a ring 121 having a roughly T-shaped cross-sectional configuration and an outer cylindrical ring 122 which is fixed to ring 121 in a fluid-tight manner as by welding, or the like. The manifold 120 is held in position between the die base 91 and the cup ring assembly 104 and suitable fluid seals are provided between the mandrel shell 95 and manifold 120 to prevent escape of liquid 35 from the manifold 120.

The manifold 120 has a pair of substantially toroidal chambers 123 and 124 provided therein which provide flow of heat transfer liquid 35 circumferentially around the central die portion 11C. The chambers 123 and 124 communicate with passages 123A and 124A respectively and the chambers 123-124 and passages 123A-124A comprise the previously described interconnected passages 52.

The previously mentioned radially extending liquid conveying passages 55 communicate with passages 123A and 124B and assure that liquid 35 is provided adjacent each strand channel 47. In particular, reference is made to FIG. 5 of the drawings where it is seen that a plurality of four strand channels 47 have been shown defining three zones X, Y, and Z between immediately adjacent pairs of channels. Heat transfer liquid 35 flows both inwardly and outwardly between channels 47 defining zone X with air 24 being supplied from passage 27 through radial passages 27C, also see FIG. 4, and into passage 30. The flow of liquid 35 and air 24 between the channels 47 defining zone Y as similar to the flow in zone X. Only air flow is provided between the channels 47 defining zone Z and such air 24 is from the bubble 25 and has passed through passages 33 and chamber 34 whereupon it is conveyed by radial air passages 34A to air discharge passages 36. Following zone Z, zones X, Y and Z are repeated around the entire circumference of the die.

As will be apparent particularly from FIGS. 2 and 4 of the drawings, the passage 45 is provided with a plurality of radially inwardly directed passages 125 adjacent thereto which are angularly spaced only a few degrees apart, essentially as shown in FIG. 2. The passages 125 are supplied with liquid 35 from an annular chamber 126 which is in turn supplied with liquid from inlet 79. The passages 125 communicate with a chamber 127 which supplies liquid to passage 83. The passages 83 and 125 together with chambers 126 and 127 comprise the plurality of interconnected passages 51 previously described in connection with FIG. 3 and such interconnected passages assure precise temperature control of the melt 15 in passages 44 and 45.

As previously mentioned, the die 11 has a stranding chamber 46 and a combining chamber 49 and such chambers are arranged to opposite ends of the strand channels 47, see FIGS. 6–9. The chamber 46 is defined by cooperating surfaces in the die base 91 and the mandrel shell 95. The chamber 49 is defined by cooperating surfaces in the mandrel shell 95 and the lower inside portion of the pad ring 102. The chambers 46 and 49 are very similar and fragmentary portions of these chambers are shown in FIGS. 8 and 9 respectively; therefore, similar component parts thereof will be given identical reference numerals and subsequently described only in connection with the stranding chamber 46 with it being understood that a similar description is fully applicable to the combining chamber 49.

The chambers 46 and 48 help assure smooth flow of viscoelastic material through the die at a substantially constant shear rate, even though the melt 15 is being stranded or separated into a plurality of spaced strands in the chamber 46 and combined in a tubular form in chamber 49. The flow of melt 15 at a substantially constant shear rate is also made possible through the use of the integral heat transfer passages provided in the die 11 which assure that the melt flowing through such die is kept at a substantially constant temperature by the action of the liquid 35 providing either heating or cooling, as required, and by heating the air 24 which flows out of the bubble 25 to prevent cooling of the plastic melt by such air as it exits the die 11.

Each chamber 46 and 49 has a pair of opposed walls or surfaces 133 and 134 and those portions of walls 133–134 which are arranged nearer the center of the die 11 are arranged approximately horizontally and in substantially parallel relation. The chamber 46 also has an undulating peripheral surface which is designated generally by the reference numeral 131 in FIG. 6 and extends approximately vertically between walls 133 and 134. The surface 131 is defined by a plurality of spikes or substantially V-shaped surfaces 135 interconnected at their bases by arcuate surfaces 136 which may be substantially semicylindrical in some applications.

The V-shaped surfaces 135 are provided with a fillet 137 extending in a smooth arc between surface 133 and surface 134. A fillet 137 is also provided between arcuate surface 136 and surface 133 and in this latter instance, such fillet has a substantially elliptical cross-sectional configuration. The fillet 137 further assures smooth flow of melt through its associated chamber. As will be apparent from FIG. 6, each of the surfaces 136 is aligned with an associated roughly semicylindrical wall portion of a strand channel 47 whereby the projections 135, arcuate surface 136, and fillet surfaces 137 provide smooth converging flow of melt from stranding chamber 46 into the strand channels 47. Similar surfaces in the combining chamber 49 provide smooth diverging flow of the melt into the annular passage 50 which communicates with the discharge orifice 13.

The spaced bores 47 preferably have circular cross-sectional configurations throughout their lengths and, in this example, each of these bores has a tapered or frustoconical configuration. The frustoconical configuration may be precisely finished using tapered helical reamers to provide a smooth surface which assures the plastic melt will flow through the die with minimum resistance and stagnation.

The heat transfer liquid 35 is of the type which has a relatively high thermal conductivity and a high boiling point. One liquid which has been successfully used is sold under the trade name of THERMINOL FR-1 and is manufactured by the Monsanto Company, St. Louis, Missouri.

The improved apparatus and method of this invention has been presented in connection with the making of polyvinyl chloride film using an associated melt; however, it is to be understood that this invention may be used to make film using any suitable viscoelastic material capable of being extruded through an extrusion die.

It has also been found that temperatures of the die 11 at most melt-wetted surfaces are within one or two degrees Fahrenheit of the temperature of the heat transfer liquid 35 flowing through the die, as determined by actual measurements. Further, the melt-wetted surfaces have been found to very no more than roughly plus or minus 1°F. over the range of heat loads normally encountered in processing.

The apparatus and method of this invention assures precisely controlled flow of viscoelastic material through the die 11 under optimum conditions and such controlled flow is provided because the shear rate of the melt at the wall of the channel is maintained substantially constant due to the unique design of the melt flow channels and the precise control of the temperature of the melt. Thus, the plastic film extruded from the die 11 is of optimum quality and hence substantially free of thickness buildups, striations, imperfections, discolorations, or holes.

In a typical application using the apparatus and method of this invention to make polyvinyl chloride film, the die 11 had an outlet orifice diameter of 10 inches and the die had 72 strand channels. Melt was provided from extruder 14 so that it entered the inlet 12 of die 11 at a flow rate of approximately 400 lbs. per hour, at a temperature of approximately 420°F., and a pressure of approximately 3,500 psi. The melt extruding from the outlet orifice 13 was at a temperature of approximately 435°F.

It has been found by tests that the melt temperature rises in the die due to dissipation of the pressure at the rate of about 6.5°F. per 1,000 psi. Although some of the heat is lost to the cooler die surfaces, it will be readily apparent that there is generally a need to provide for local cooling of the melt particularly in local hot spots near the die outlet.

The heat transfer liquid 35 in this application entered the die at a temperature of approximately 420°F. and a pressure of approximately 20 psi and exited the die at approximately 420°F. and 15 psi.

The air 24 to the die was controlled so that it was heated by the heat exchanger 64 and entered the die 11 at a temperature of approximately 390°F. and a flow rate of about 10 cfm. The air 24 exited the die at essentially the same temperature and flow rate. The air entered the bubble 25 at a temperature of approximately 380°F. and 10 cfm and exited the bubble at an estimated temperature of 200°F. and 10 cfm whereupon it was reheated in the die so that it exited the die at the previously mentioned temperature of about 390°F. and flow rate of 10 cfm so as not to adversely affect the temperature of the melt.

It has been found that polyvinyl chloride film made using the apparatus and method of this invention has film thickness variations which are regularly and significantly less than one-half the thickness variations found in polyvinyl chloride film made using previously proposed apparatus and methods.

While present exemplary embodiments of this invention, and methods of practicing the same, have been illustrated and described, it will be recognized that this invention may be otherwise variously embodied and practiced within the scope of the following claims.

What is claimed is:

1. A method of extruding plastic film through a die having a central longitudinal axis comprising the steps of, feeding a plastic melt under pressure to a die inlet, dividing the melt using parallel bores in said die into a plurality of spaced melt strands arranged parallel to said axis and thereafter recombining it at the outlets of said bores in a single combining chamber to form an annulus of plastic melt concentrically around said axis, extruding the melt annulus through a die orifice and solidifying the melt into a plastic tube, and heating and continuously feeding a heat transfer fluid through the die and circulating part of the fluid adjacent the outside of the melt annulus and part of the fluid adjacent the inside of the melt annulus with that part of the fluid circulating adjacent the inside of the melt annulus passing through passages which extend substantially radially through said die between several adjacent pair of said plurality of melt strands to reach and return from adjacent the inside of the melt annulus, said fluid passing between adjacent pairs of strands toward the inside of the melt annulus passing on at least one side of each of said strands, said fluid passing through said substantially radially extending passages serving to control the temperature of said die between said strands to thereby control the temperature and flow of the melt defining said strands.

2. A method of making plastic film comprising the steps of, feeding a plastic melt under pressure to an inlet of an extrusion die having a central longitudinal axis, dividing the melt using parallel bores in said die into a plurality of spaced melt strands arranged parallel to said axis and thereafter recombining it at the outlets of said bores in a single combining chamber to form an annulus of plastic melt concentrically around said axis, extruding the melt annulus through a die orifice to define a plastic tube, closing said tube at a position spaced from said outlet, supplying a gas through said die into said tube causing inflation thereof to form a plastic bubble which is used to define said film, and heating and continuously feeding a heat transfer fluid through the die and circulating part of the fluid adjacent the outside of the melt annulus and part of the fluid adjacent the inside of the melt annulus with that part of the fluid circulating adjacent the inside of the melt annulus passing through passages which extend substantially radially through said die between several adjacent pair of said plurality of melt strands to reach and return from adjacent the inside of the melt annulus, said fluid passing between adjacent pairs of strands toward the inside of the melt annulus passing on at least one side of each of said strands, said fluid passing through said substantially radially extending passages serving to control the temperature of said die between said strands to thereby control the temperature and flow of the melt defining said strands.

3. A method as set forth in claim 2 and further comprising the steps of circulating the gas in said bubble and removing the gas exiting therefrom through passages in said die which are arranged so that said exiting gas is heated to a temperature which is sufficiently high to prevent cooling of said melt upon following said exiting gas out of said die.

4. A method as set forth in claim 3 in which said supplying step comprises supplying a preheated gas through said die.

5. A method as set forth in claim 3 in which said supplying step comprises supplying preheated air and said heating and continuously feeding step comprises heating and continuously feeding of heat transfer liquid.

6. A method as set forth in claim 5 in which said heating and continuously feeding step comprises providing said liquid from a reservoir thereof and said supplying step comprises supplying said air which has been preheated by said liquid.

7. A method of making polyvinyl chloride film comprising the steps of, feeding a plastic melt under pressure to an inlet of an extrusion die having a central longitudinal axis, dividing the melt using parallel bores in said die into a plurality of spaced melt strands arranged parallel to said axis and thereafter recombining it at the outlets of said bores in a single combining chamber to form an annulus of plastic melt concentrically around said axis, extruding the melt annulus through a die orifice to define a plastic tube, closing said tube at a position spaced from said outlet, supplying a gas through said die into said tube causing inflation thereof to form a plastic bubble which is used to define said film, and heating and continuously feeding a heat transfer fluid through the die and circulating part of the fluid adjacent the outside of the melt annulus and part of the fluid adjacent the inside of the melt annulus with that part of the fluid circulating adjacent the inside of the melt annulus passing through passages which extend substantially radially through said die between several adjacent pairs of said plurality of melt strands to reach and return from adjacent the inside of the melt annulus, said fluid passing between adjacent pairs of strands toward the inside of the melt annulus passing on at least one side of each of said strands, said fluid passing through said substantially radially extending passages serving to control the temperature of said die between said strands to thereby control the temperature and flow of the melt defining said strands.

* * * * *